(12) United States Patent
Jeanroy

(10) Patent No.: US 8,910,520 B2
(45) Date of Patent: *Dec. 16, 2014

(54) VIBRATING GYROSCOPE AND CORRESPONDING MANUFACTURING PROCESS

(75) Inventor: Alain Jeanroy, Paris (FR)

(73) Assignee: Sagem Defense Securite, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/996,428

(22) PCT Filed: Oct. 27, 2011

(86) PCT No.: PCT/EP2011/068907
§ 371 (c)(1),
(2), (4) Date: Jun. 20, 2013

(87) PCT Pub. No.: WO2012/084312
PCT Pub. Date: Jun. 28, 2012

(65) Prior Publication Data
US 2013/0269433 A1 Oct. 17, 2013

Related U.S. Application Data

(60) Provisional application No. 61/488,938, filed on May 23, 2011.

(30) Foreign Application Priority Data

Dec. 22, 2010 (FR) ..................................... 10 05070

(51) Int. Cl.
*G01C 19/56* (2012.01)
*G01C 19/5691* (2012.01)
*G01C 25/00* (2006.01)

(52) U.S. Cl.
CPC ............ *G01C 19/56* (2013.01); *G01C 19/5691* (2013.01); *G01C 25/005* (2013.01); *G01C 25/00* (2013.01)
USPC ..................................... 73/504.13; 73/504.12

(58) Field of Classification Search
USPC .............................. 73/504.13, 504.12, 504.04
See application file for complete search history.

(56) References Cited

U.S. PATENT DOCUMENTS 4,157,041 A * 6/1979 Loper et al. ................. 73/504.13
4,644,793 A 2/1987 Church
6,640,630 B1 * 11/2003 de Salaberry .............. 73/504.13

(Continued)

FOREIGN PATENT DOCUMENTS

| FR | 2717267 | | 9/1995 |
|---|---|---|---|
| FR | 2814234 | | 3/2002 |
| GB | 2310284 | * | 8/1997 |
| JP | 2009092595 | | 4/2009 |

*Primary Examiner* — Helen Kwok
(74) *Attorney, Agent, or Firm* — Blakely Sokoloff Taylor & Zafman

(57) ABSTRACT

A vibrating gyroscope having a base, and a resonator. The resonator includes a body of generally cylindrical shape terminating in a distal face to the side opposite the base. The face includes at least one through hole, a plurality of piezoelectric elements placed in contact with the resonator, vibration control and processing modules arranged at least in part on the base, and at least one electrical connection passing through the body of the resonator via the hole, and electrically connecting the modules of the base and the plurality of piezoelectric elements for controlling and measuring the vibration of the resonator.

9 Claims, 9 Drawing Sheets

(56) References Cited

U.S. PATENT DOCUMENTS

| | | | |
|---|---|---|---|
| 7,123,111 B2 * | 10/2006 | Brunson et al. | 331/116 M |
| 7,281,425 B2 * | 10/2007 | Chikovani et al. | 73/504.13 |
| 7,281,426 B1 * | 10/2007 | Chikovani et al. | 73/504.13 |
| 7,617,727 B2 * | 11/2009 | Watson | 73/504.13 |
| 2010/0154542 A1 | 6/2010 | Okon | |
| 2012/0297875 A1 * | 11/2012 | Jeanroy | 73/504.12 |

* cited by examiner

VIBRATING GYROSCOPE AND CORRESPONDING MANUFACTURING PROCESS

GENERAL TECHNICAL FIELD

The invention relates to a vibrating gyroscope and a process to make such a gyroscope.

STATE OF THE ART

Vibrating gyroscopes are currently used in numerous fields, especially because of their solidity, their reduced electrical consumption, and their rapid execution.

These gyroscopes comprise a resonator which can take various forms, such as a bell or a tuning fork.

The invention relates more particularly to resonators comprising a body of generally cylindrical shape.

The axis z is conventionally designated as the axis of the cylinder, the axes x, y being arranged in the plane orthogonal to the axis z.

It is known that such a resonator in vibration deforms itself preferably elliptically, with four vibration antinodes regularly arranged over the circumference of the cylinder in the plane x, y. A first vibration mode 53, 57 of the resonator is illustrated in FIG. 1, at two given instants, relative to its rest state 54. The resonator passes from ellipse 53 to ellipse 57 at the end of a semi-period, but this is still the same vibration mode.

Any rotation of the gyroscope about the axis z generates Coriolis forces which have a tendency to cause offset in rotation of vibration antinodes about the circumference of the cylinder. Piezoelectric detection elements, placed at the level of the vibration antinodes, measure a signal which variation determines the angular rotation speed and/or the angle of rotation about the axis z.

By way of illustration, it is evident in FIG. 1 that rotation of the resonator causes secondary vibration in elliptical mode 52, 58 whereof the principal axes $x_1$, $y_1$ are located at 45° from the axes x, y. Vibration passes from ellipse 52 to ellipse 58 at the end of a semi-period.

The signal measured by the piezoelectric detection elements at the level of these axes especially determines the angular rotation speed.

In general, gyroscopes comprise four piezoelectric detection elements for maintaining the vibration of said resonator, and four other piezoelectric elements for measuring the vibration signal of the resonator. These eight elements are most often arranged uniformly about the resonator (four on axes x, y and four on axes $x_1$, $y_1$).

However, the gyroscopes with cylindrical resonator known to date have the disadvantage of being less compact and difficult to manufacture. Also, they are highly sensitive to the vibratory environment.

Therefore a solution improving devices of the prior art should be proposed.

PRESENTATION OF THE INVENTION

For this purpose, the invention proposes a vibrating gyroscope characterised in that it comprises a base, a resonator, comprising a body of generally cylindrical shape terminating in a distal face, to the side opposite the base, said face comprising at least one through hole, a plurality of piezoelectric elements placed in contact with the resonator, modules for vibration control and processing, arranged at least in part in the base, and at least one electrical connection passing through the body of the resonator via said hole, and electrically connecting said modules of the base and the plurality of piezoelectric elements for controlling and measuring the vibration of the resonator.

The invention is advantageously completed by the following characteristics, taken singly or in any of their technically possible combinations:

- the face comprises a plurality of through holes arranged over its circumference, and said gyroscope also comprises a plurality of electrical connections passing through at least one sub-assembly of said holes for electrical connection of the base modules with the plurality of piezoelectric elements;
- the holes are arranged substantially uniformly over the circumference of the face, and the piezoelectric elements are arranged between said holes;
- the gyroscope comprises an interconnection circuit connecting the plurality of electrical connection, and being connected to the piezoelectric elements;
- the gyroscope comprises a linking foot between the resonator and the base, said foot being arranged at the level of the extension of a central hole of the face of the resonator;
- the control and processing modules of the base and the piezoelectric elements are connected by at least one electrical connection passing through the linking foot;
- part of the piezoelectric elements is capable of detecting vibrations of the resonator and the other part of the piezoelectric elements is capable of exciting the resonator in vibration;
- each piezoelectric element at the same time comprises a sub-element capable of detecting vibrations of the resonator and a sub-element capable of exciting the resonator in vibration;
- the resonator is capable of vibrating according to a first vibration mode, comprising antinodes distributed on two axes, and a second vibration mode comprising antinodes distributed on two other axes, the face of the resonator on each axis of the first and of the second vibration modes comprising two piezoelectric assemblies, each piezoelectric assembly at the same time comprising at least one piezoelectric sub-element capable of exciting the resonator in vibration and at least one piezoelectric sub-element capable of detecting vibrations of the resonator.

The invention likewise proposes a making process of a vibrating gyroscope, comprising steps consisting of providing a base, forming a resonator comprising a body of generally cylindrical form terminating in a distal face, to the side opposite the base, said face comprising at least one through hole, disposing a plurality of piezoelectric elements in contact with the resonator, mechanically assembling the resonator on the base, placing vibration control and processing modules in the base, and electrically connecting said base modules and the plurality of piezoelectric elements via at least one electrical connection passing through the body of the resonator via said hole for controlling and measuring vibration of the resonator.

The invention has numerous advantages.

An advantage of the invention is to propose a more compact vibrating gyroscope.

An advantage of the invention is to propose a vibrating gyroscope having a lower angular derive.

Another advantage of the invention is to propose a gyroscope easier to manufacture.

Yet another advantage of the invention is to propose a gyroscope having lower production costs.

Finally, another advantage of the invention is to propose a gyroscope less sensitive to the vibratory environment.

PRESENTATION OF FIGURES

Other characteristics, aims and advantages of the invention will emerge from the following description which is purely illustrative and non-limiting and which must be considered with respect to the attached diagrams, in which:

FIG. 1, already commented on, is an illustration of vibration modes of a gyroscope with cylindrical resonator;

DETAILED DESCRIPTION

Figure 1:
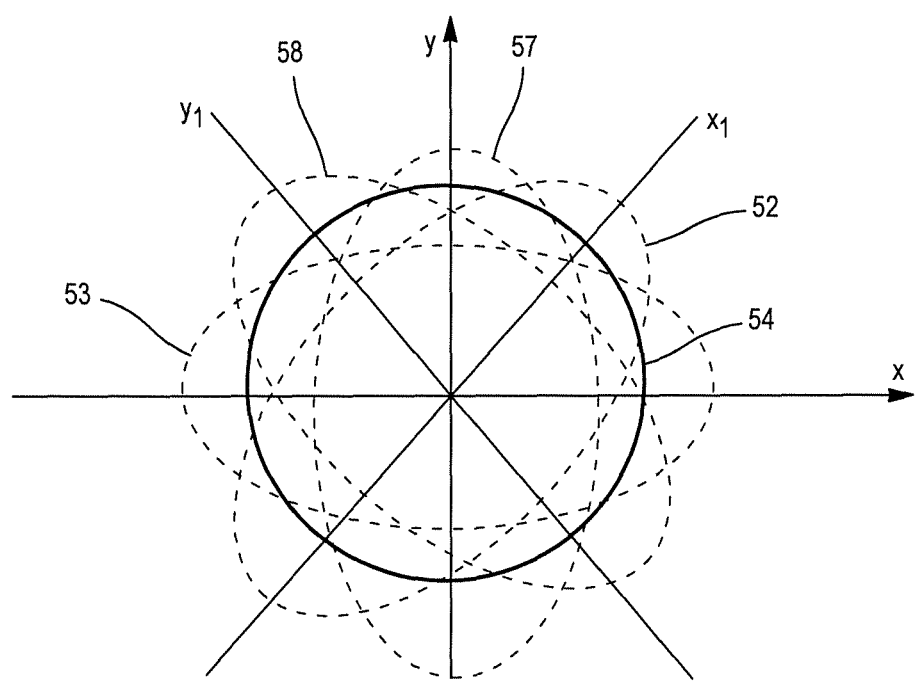
Figure 2:
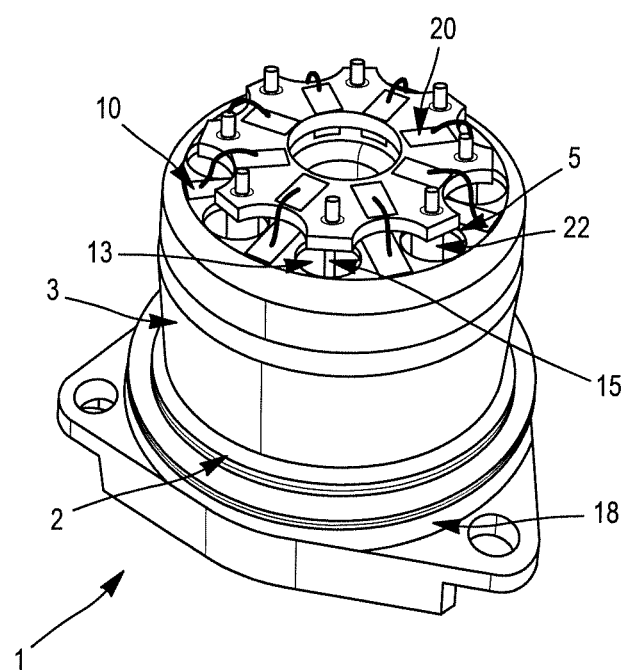
FIG. 2, is an illustration of an embodiment of a gyroscope according to the invention.
Figure 3:
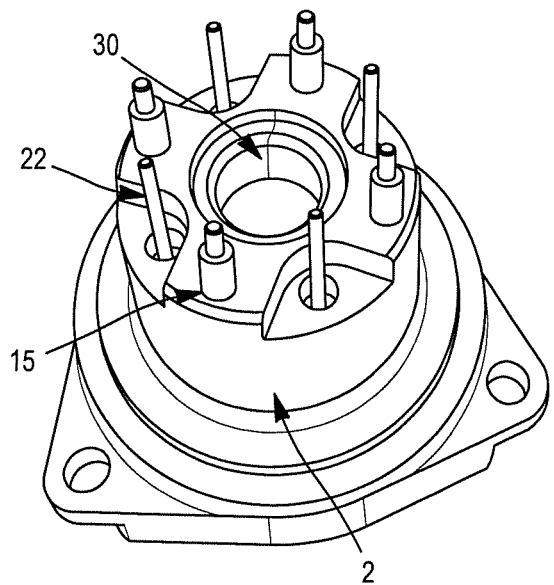
FIG. 3 is an illustration of an embodiment of a base of gyroscope according to the invention.

FIG. 2 shows an embodiment of a vibrating gyroscope 1 according to the invention.

The gyroscope 1 comprises a base 2, which acts as plinth. The gyroscope 1 also comprises a certain number of vibration control and processing modules 18, described later, and placed at least in part in the base 2. In general, these modules 18 are arranged on an electronic control card integrated into the lower part of the base 2, and covered by a protective cap.

The gyroscope 1 also comprises a resonator 3. This resonator 3 comprises a body 4 of generally cylindrical shape terminating in a distal face 5, to the side opposite the base 2.

The resonator 3 is generally a metallic piece.

The face 5 is particular in that it comprises at least one through hole 13. In the embodiment of FIG. 2 the face 5 comprises a plurality of through holes 13.

The gyroscope 1 also comprises a plurality of piezoelectric elements 10, placed in contact with the resonator 3. Advantageously, these piezoelectric elements 10 are disposed on the face 5 of the resonator 3, turned to the exterior of the resonator 3. These piezoelectric elements 10 are designed to measure the vibration of the resonator 3 and maintain it. These are generally piezoelectric electrodes.

For example, it is known to use lead zirconate titanate as piezoelectric material.

The gyroscope 1 has at least one electrical connection 15, passing through the interior of the body of the resonator 3 via said hole 13, and electrically connecting said modules 18 of the base 2 to the plurality of piezoelectric elements 10, for controlling and measuring the vibration of the resonator 3.

This connection 15 could be relayed by an interconnection card 20, acting as an interface between the connection 15 and the piezoelectric elements 10.

As is it evident, this configuration creates a highly compact gyroscope, since the electrical connections between the control and measuring modules 18 and the piezoelectric elements 10 are made via the interior of the body of the resonator 3, via at least one dedicated hole 13 of the face 5 of the resonator 3 opposite the base 2.

Figure 4:
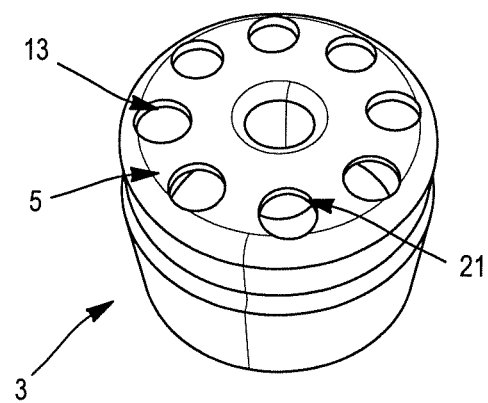
FIG. 4 is an illustration of another embodiment of a resonator of a gyroscope according to the invention.

Advantageously, the face 5 comprises a plurality of through holes 13 arranged on its circumference, as illustrated in FIGS. 2 and 4.

In this case, the gyroscope 1 also comprises a plurality of electrical connections 15 passing through at least one sub-assembly of said holes 13, for the electrical connection of the modules 18 of the base 2 and the plurality of piezoelectric elements 10.

The rest of the holes can be used for the entry of mechanical links, for example rods 22 serving to mechanically link the interconnection card 20 with the base 2.

Advantageously, the holes 13 are arranged substantially uniformly over the circumference of the face 5, that is, with regular or quasi-regular angular offset.

In this case, it is advantageous to place the piezoelectric elements 10 between said holes.

Advantageously, the holes 13 are shaped as a disc made in the face 5 of the resonator described earlier.

Advantageously, the resonator comprises a central hole arranged at the centre of the face 5 and prolonged by a linking foot 21 between the resonator 3 and the base 2. This linking foot can have various functions and especially act as mechanical link between the resonator and the base, and/or allow passage for electrical connections between the modules of the base and the piezoelectric elements. The foot is arranged inside the body the resonator.

Advantageously, the base 2 comprises a recess of shape complementary to the foot 21, and capable of receiving the linking foot 21 to mechanically join the resonator and the base.

In general, the gyroscope 1 comprises an interconnection card 20 connecting the plurality of electrical connection 15 and being connected to the piezoelectric elements 10.

This interconnection card 20 is used for transmission of information or commands sent by the control and processing modules 18 to the piezoelectric elements, or vice versa.

In general, part of the piezoelectric elements 10 is capable of exciting the resonator in vibration, and the other part of the piezoelectric elements 10 is capable of detecting vibrations of the resonator.

Eight piezoelectric elements could be used for example, arranged uniformly on the face 5 of the resonator 3, with four of said elements dedicated to detecting vibrations, and four of said elements dedicated to excitation of the resonator.

Figure 5:
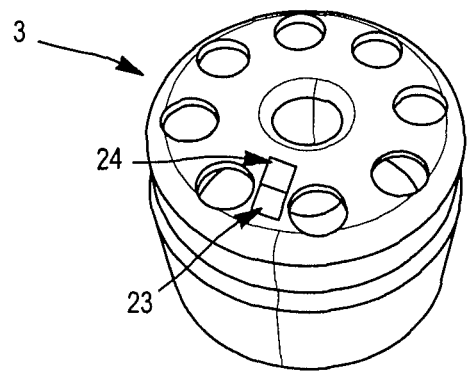
FIG. 5 is an illustration of an embodiment of a resonator comprising a piezoelectric element according to the invention.

Alternatively, each piezoelectric element 10 at the same time comprises a piezoelectric sub-element 23 capable of exciting the resonator in vibration and a piezoelectric sub-element 24 capable of detecting vibrations of the resonator, as illustrated in FIG. 5. In general, the sub-elements 23, 24 are arranged near or adjacent to each piezoelectric element 10.

Advantageously, the sub-elements 23, 24 of the same piezoelectric element 10 are arranged on the same radius of the face 5. They are generally distinct sub-elements 23, 24 but arranged near one another.

In general, the sub-elements 23, 24 are arranged on two concentric circles of different radii.

These can be distinct sub-elements, arranged near one from another, or contiguous zones of the same piezoelectric element.

In general, these are pellets, rectangular and metalized on their two faces, one of the face being stuck or brazed on the face of the resonator constituting the earth.

As explained earlier, the resonator is capable of vibrating according to a first vibration mode comprising antinodes distributed over two axes, and a second vibration mode comprising antinodes distributed over two other axes. They are elliptical vibration modes.

Advantageously, the face of the resonator comprises on each axis of the first and second vibration modes two piezoelectric elements 10, each piezoelectric element 10 at the same time comprising at least one piezoelectric sub-element 23 capable of exciting the resonator in vibration and at least one piezoelectric sub-element 24 capable of detecting vibrations of the resonator.

This finally yields at least sixteen piezoelectric elements. This number can be limited to sixteen piezoelectric elements, with eight elements 10 each comprising two sub-elements 23, 24.

This is a major advantage for rejecting parasite modes occurring in the resonator, and multiplying the vibration measuring and control points, as explained hereinbelow.

In general, the gyroscope also comprises a protective cap, not shown, for retaining the vacuum created later under said cap and covering the assembly comprising the resonator and the base. The cap is for example a bell or a cylinder.

Figure 6:
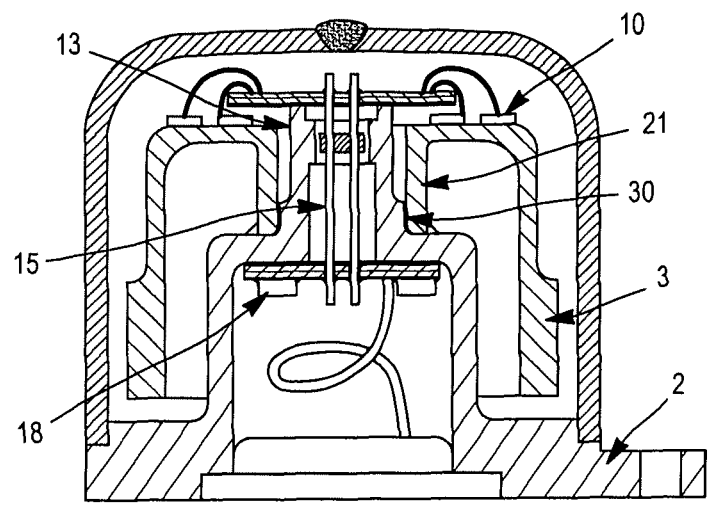
FIG. 6 is an illustration of another embodiment of a vibrating gyroscope according to the invention.

In an embodiment illustrated in FIG. 6, the face 5 comprises a central hole 13. The resonator also comprises a linking foot 21 between the resonator 3 and the base 2, arranged at the level of the extension of the central hole 13. The foot is arranged inside the body of the resonator.

The foot 21 allows at least one electrical connection 15 to pass through, thus connecting the vibration control and processing modules 18 arranged in the base 2 and the piezoelectric elements 23, 24. The foot 21 likewise acts as mechanical linking between the resonator 3 and the base 2, especially by way of its complementary form with a recess 30 of the base 2.

This embodiment produces a highly compact gyroscope.

It is likewise possible to provide additional holes 13 in the face 5, as mentioned earlier.

Figure 7:
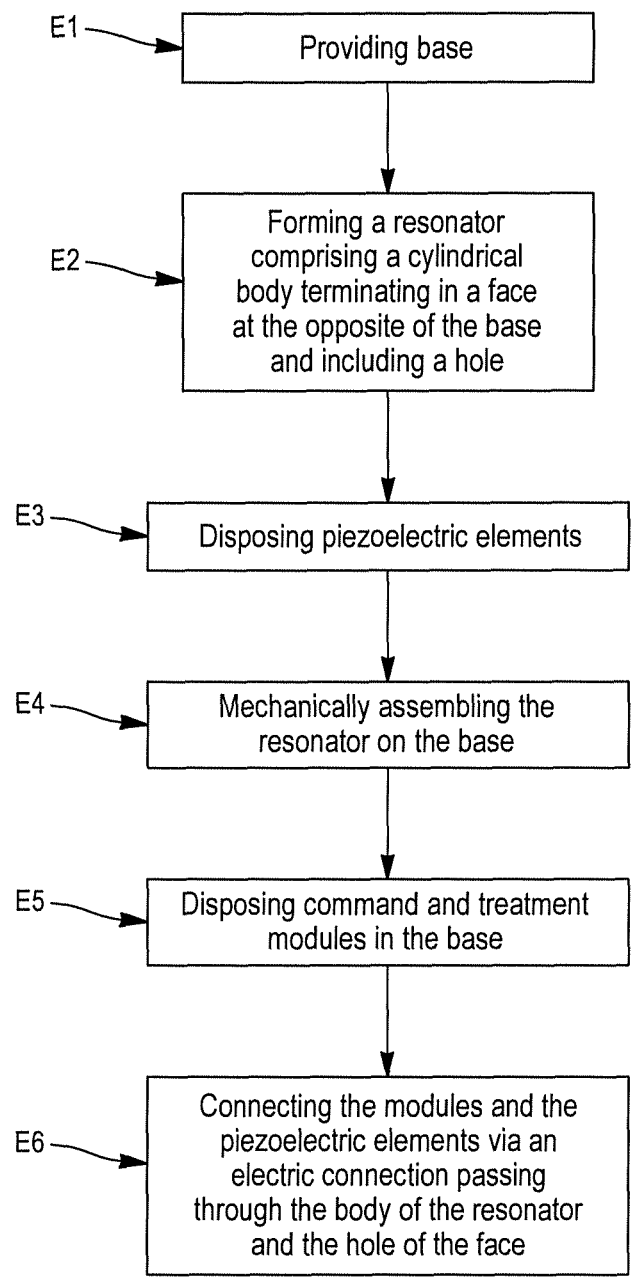
FIG. 7 is a schematic illustration of steps of a treatment process according to the invention.

The invention also relates to a production process of a vibrating gyroscope 1, such as described earlier. The process, illustrated in FIG. 7, comprises steps consisting of:
  providing a base 2 (step E1),
  forming a resonator 3, comprising a body 4 of generally cylindrical form terminating in a distal face 5, to the side opposite the base 2, said face 5 comprising at least one through hole 13 (step E2),
  placing a plurality of piezoelectric elements 10 in contact with the resonator 3, preferably on the face 5 (step E3),
  mechanically assembling the resonator 3 on the base 2 (step E4),
  placing, at least in part, vibration control and processing modules 18 in the base 2 (step E5), and
  electrically connecting said modules 18 of the base 2 and the plurality of piezo-electrical elements 10, via at least one electrical connection 15 passing through the interior of the body 4 of the resonator 3 via said hole 13, for controlling and measuring the vibration of the resonator 3 (step E6).

In general, the resonator 3 is fixed on the base 2 by brazing.

In conventional terms, the process comprises a degassing step, and a step of vacuum sealing via the protective cap covering the assembly.

Because of the process according to the invention, the gyroscope is much easier to make, especially at the level of the electrical connections to be put in place, which can be made for example by a bonding process between the piezoelectric elements 10 and the interconnection card 20.

Figure 8:
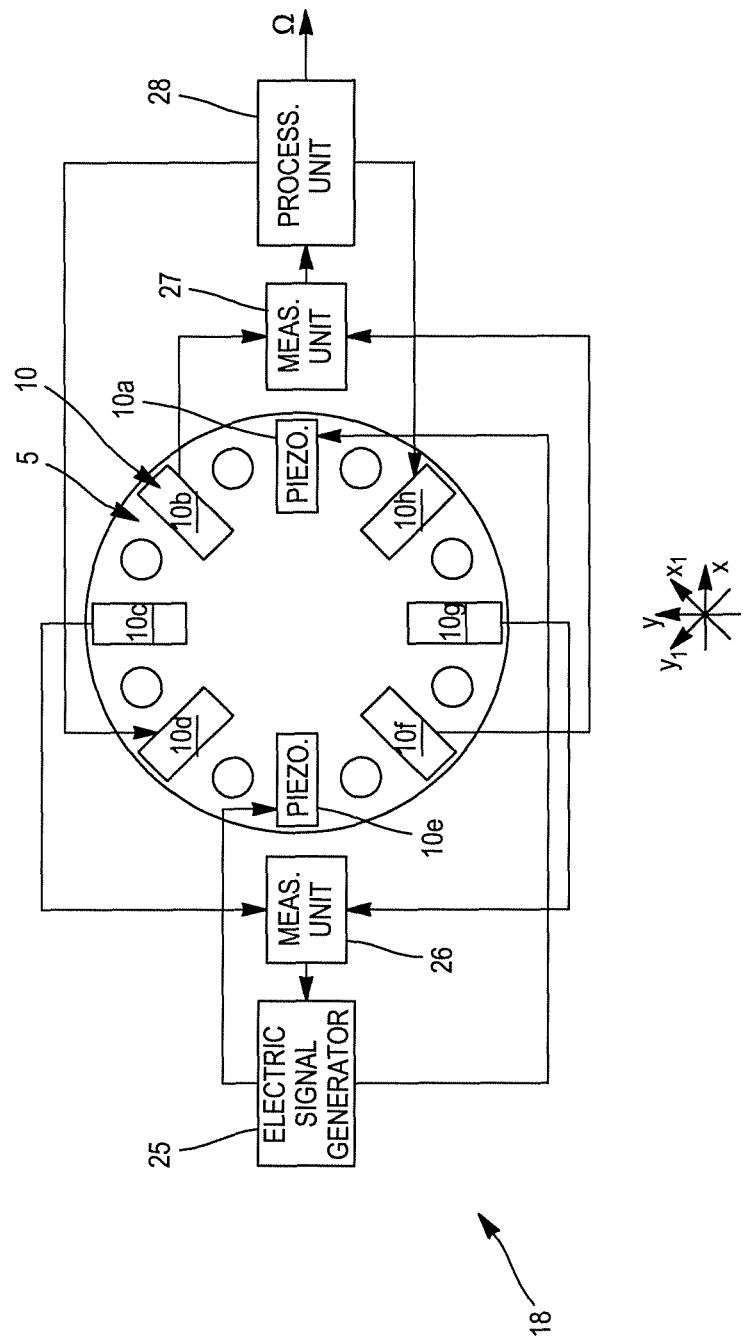
FIG. 8 is a schematic illustration of a embodiment of the processing of the vibration according to the invention.

FIG. 8 illustrates an embodiment of the vibration control and processing in a gyroscope according to the invention.

This is especially completed by using vibration control and processing modules 18, arranged at least in part in the base 2. Of course, part of the modules 18 can be arranged outside the gyroscope 1, for example on an electronic card placed near the gyroscope 1.

In general, the vibration control and processing modules 18 are adapted to maintain the vibration of the resonator in cooperation with the piezoelectric elements 10 and for measuring the vibrations caused in the resonator. Most often, they comprise one or more electric signal generators, and electric modules such as amplifiers, filters, multipliers, adders, subtractors or the like.

The modules 18 are adapted to process the measured signal to deduce therefrom an angle of rotation and/or a speed of rotation about the axis z of the cylindrical body of the resonator 3.

The modules 18 at the same time constitute a vibration excitation circuit and a detection/treatment circuit.

In general, the excitation circuit is in closed loop to give the excitation vibration of the resonator constant amplitude and a pulse equal to the pulse of the fundamental vibration mode.

It is understood that various embodiments of said modules are possible. Control and processing of vibration of the resonator of the cylinder are widely known from the prior art. Different types of execution are possible, for example: open-loop gyrometer mode, closed-loop gyrometer mode, and gyroscope mode.

FIG. 8 illustrates an embodiment of control and processing of vibration of the resonator 3 in closed-loop gyrometer mode.

The gyroscope comprises eight piezoelectric elements 10 arranged between the holes of the face 5 of the resonator 3. These elements are advantageously shaped as rectangular pellets distributed uniformly about the circumference of the face 5 of the resonator 3.

An electrical signal generator 25 excites the piezoelectric elements 10a, 10e, arranged at the level of a first axis of antinodes of the first vibration mode of the resonator (axis x).

A measuring unit 26 receives the signals measured by the piezoelectric elements 10c, 10g, arranged at the level of a second axis of antinodes of the first vibration mode of the resonator (axis y).

The measuring unit 26 compares the amplitude of the first vibration mode to a set value and transmits to the generator 25 a deviation signal relative to this set point to modify the value of the vibration excitation signals and form amplitude slave control.

Rotation of the resonator causes a second elliptical vibration mode 52 whereof the main axes $x_1$, $y_1$ are located at 45° from the axes x, y.

A measuring unit 27 receives the signals measured by the piezoelectric elements 10b, 10f, arranged at the level of a first axis of antinodes of the second vibration mode of the resonator (axis $x_1$), arranged at 45° to the axes x,y.

When operating in closed loop, a processing unit 28 receives a signal from the measuring unit 27 representing the amplitude of the signals received by the measuring unit 27, and deduces therefrom the excitation signals to be sent to the piezoelectric elements 10d, 10h, arranged at the level of a second axis of antinodes of the second vibration mode of the resonator (axis $y_1$) to cancel out the amplitude of the signals detected by the measuring unit 27. The measuring unit 27 deduces a signal representative of the angular speed of rotation Ω from the amplitude of these excitation signals.

Figure 9:
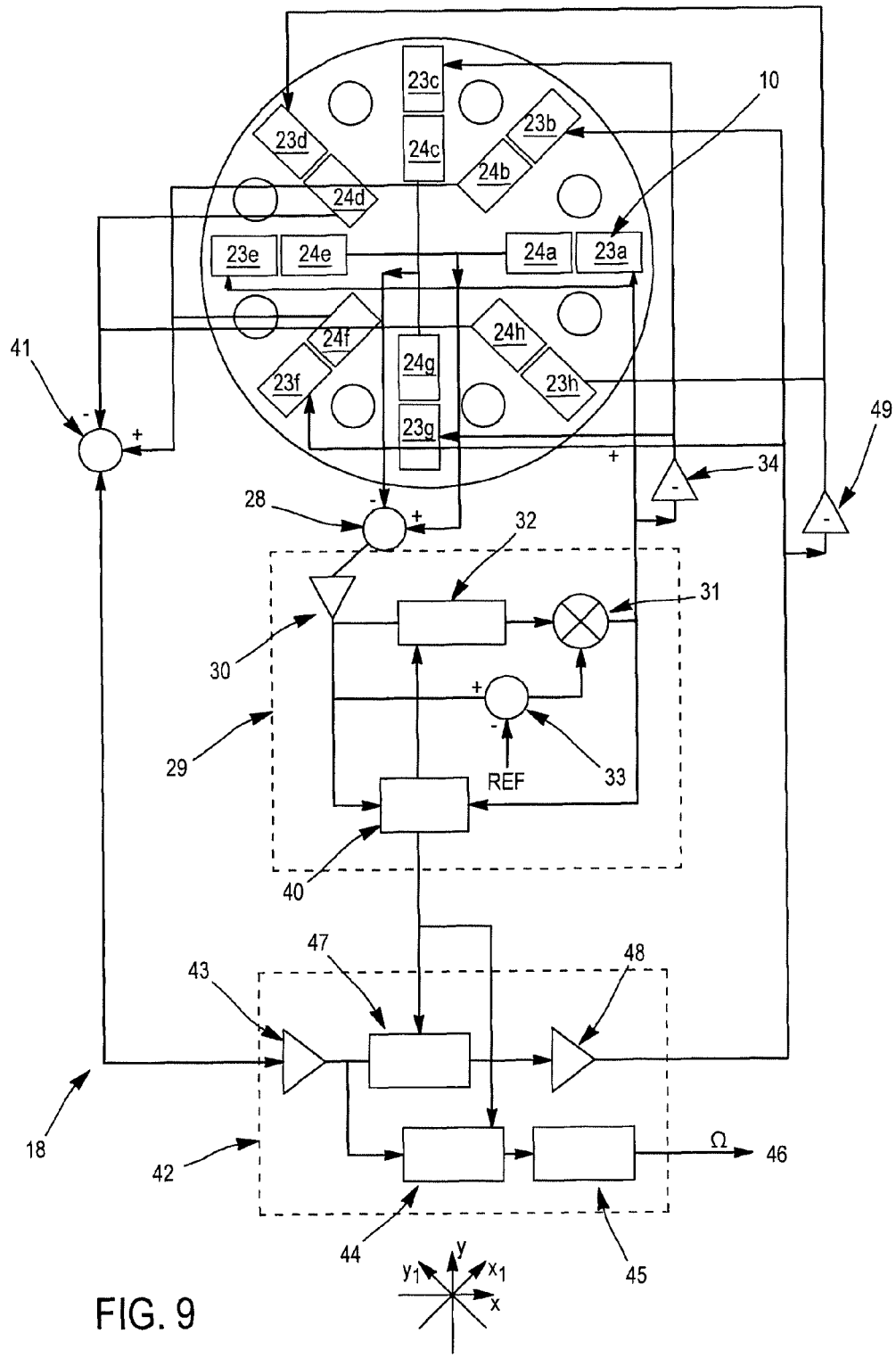
FIG. 9 is an illustration of an embodiment of the control and processing of the vibration of the resonator.
Figure 9A:
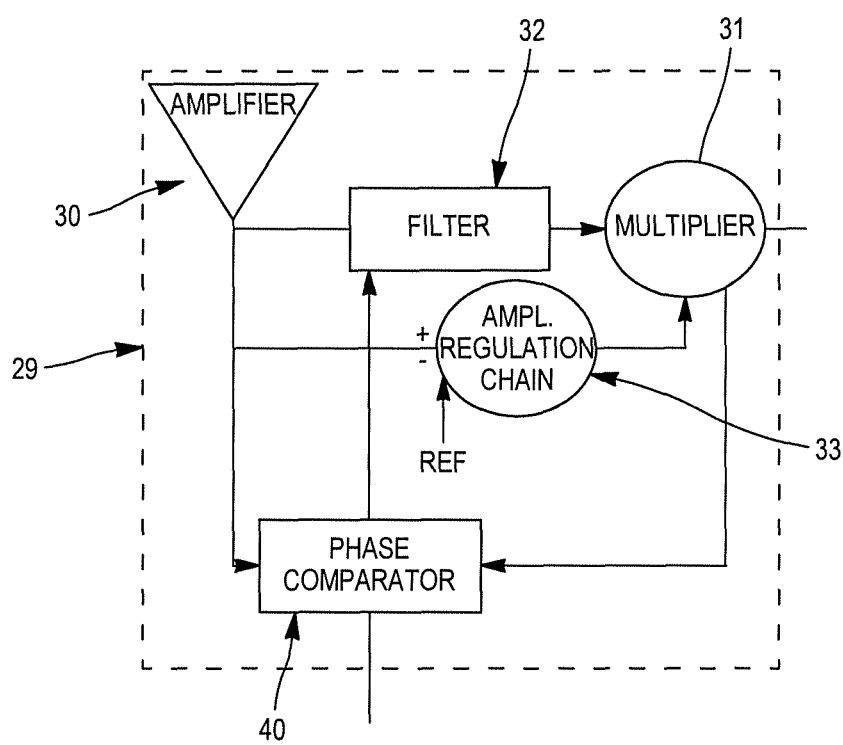
FIG. 9A is a block diagram of circuit 29 of an embodiment of the control and processing of the vibration of the resonator as shown in FIG. 9.
Figure 9B:
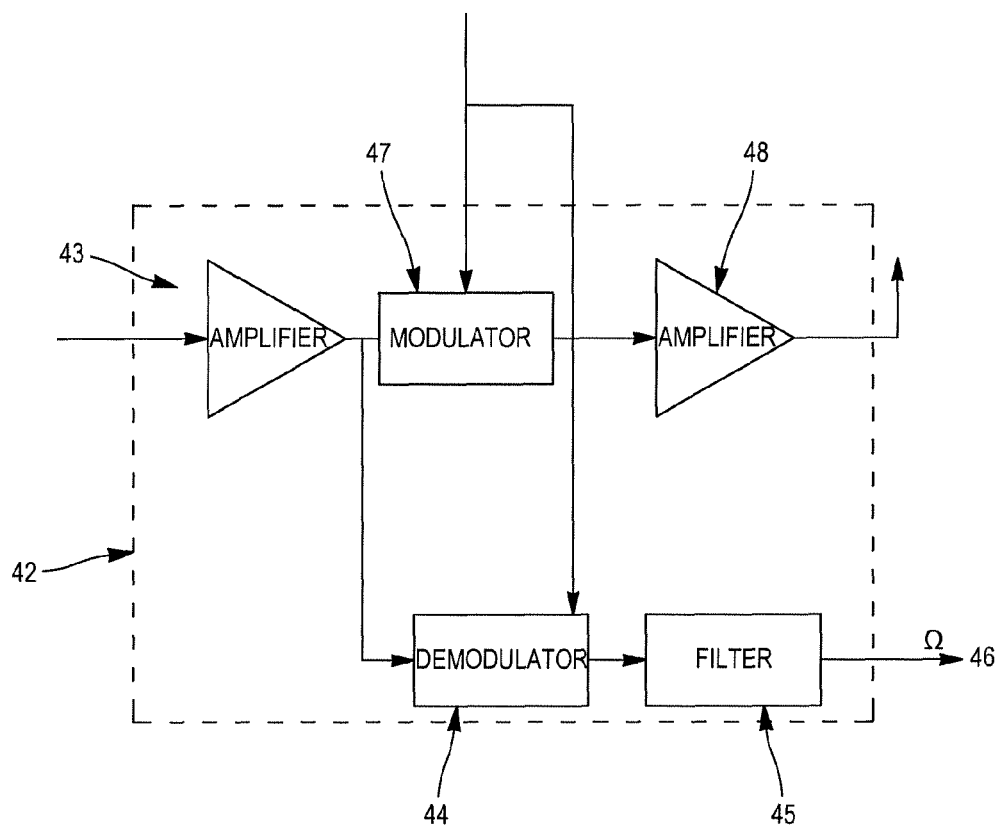
FIG. 9B is a block diagram of circuit 42 of an embodiment of the control and processing of the vibration of the resonator as shown in FIG. 9.

FIG. 9 shows another embodiment of control and processing of the vibration of the resonator.

Each of the piezoelectric elements 10 at the same time comprises a piezoelectric sub-element 23 capable of exciting the resonator in vibration and a piezoelectric sub-element 24 capable of detecting vibrations of the resonator.

The sub-elements 23, 24 are advantageously shaped as rectangular pellets.

Alternatively, the sub-elements 23 and 24 can be made in the form of contiguous zones of the same element 10.

The face 5 of the resonator 3 comprises on each axis of the first and of the second vibration mode two piezoelectric assemblies 10, each piezoelectric assembly 10 at the same time comprising at least one piezoelectric sub-element 23 capable of exciting the resonator in vibration and at least one piezoelectric sub-element 24 capable of detecting vibrations of the resonator. The piezoelectric elements 10 are arranged on either side of the centre of the face of the resonator.

Here there are therefore sixteen piezoelectric elements 23, 24, eight in excitation and eight in measurements.

This embodiment rejects parasite vibration modes which might occur in the resonator, something not possible with only eight piezoelectric elements.

In general, for each vibration mode, the processing consists of getting a treated signal equal to the sum of the measurements of the piezoelectric sub-elements located on the antinodes showing amplitude of a given sign, minus the sum of the measurements of the piezoelectric sub-elements located on the antinodes showing amplitude of a sign opposite the given sign, said treated signal rejecting parasite vibration modes of the resonator. The sign of amplitudes of the antinodes (maxima of amplitude of vibration) is defined at one given instant of vibration, since the latter varies alternatively.

Of course, it is possible to generalise this embodiment in the event where the first and the second modes of vibration each exhibit antinodes distributed over n axes, and in this case each of the n axes comprises two piezoelectric elements 10 at the same time comprising at least one excitation sub-element element 23 at least one detection sub-element 24.

The four piezoelectric sub-elements 24a, 24c, 24e and 24g, arranged according to the axes x,y of the antinodes of the first vibration mode, supply output signals each proportional to elongation of the vibration of the resonator and which are combined in a subtractor 28 to supply the input signal of a slave excitation circuit 29 of amplitude and phase.

The circuit shown by way of example comprises an amplifier 30 which attacks a multiplier 31 by way of a filter 32 piloted by a phase regulation chain.

The gain of the multiplier 31 is controlled by the amplitude regulation chain 33 which receives both the output signal of the amplifier 30 and a reference signal REF, representative of the amplitude to be maintained.

The filter 32 (active filter in general) is controlled for its part by a phase comparator 40 which receives both the output signal of the amplifier 30 and also the output signal of the circuit, coming from the multiplier 31. The phase comparator 40 controls the filter 32 so as to maintain the phase difference at a constant value, generally zero.

The output signal of the circuit 29 attacks the piezoelectric sub-elements 23a, 23c, 23e, 23g by way of an inverter 34, inverting the polarity of signals applied to the elements 23c and 23g.

The four piezoelectric sub-elements 24b, 24d, 24f, 24h supply signals which are combined in a subtractor 41 to constitute the input signal of the measuring circuit 42, in closed-loop gyrometer mode.

The circuit 42 can have a constitution of known type.

The circuit illustrated comprises an input amplifier 43 followed by a synchronous demodulator 44 which receives a reference signal constituted by an output signal of the circuit 29.

The demodulated signal is applied to a low-pass filter 45 whereof the output 46 is representative of the angular rotation speed Ω. Looping in gyrometer mode is ensured by a link between the output of the amplifier 43 and the piezoelectric sub-elements 23b, 23d, 23f, 23h, by way of a modulator 47, an amplifier 48 and an inverter 49 inverting the polarity of the signals applied to the elements 23d and 23h.

The subtractors 28 and 41 and inverters 34 and 49 can be dispensed with by appropriately orienting the polarisation vectors of the piezoelectric pellets 23, 24 relative to each other.

As indicated earlier, the invention may have numerous variant embodiments, especially related to the constitution of the control and processing modules 18 linked to the mechanical resonator.

The person skilled in the art understands that the vibration control and processing modules 18 just now described are not limiting for the invention, and that various implementations and variants are possible.

As the person skilled in the art understands, the gyroscope according to the invention is more compact, simpler and less expensive to make. Also, it has a lower angular derive than some gyroscopes of the prior art (around 10°/H in some embodiments). Finally, the invention provides a gyroscope less sensitive to the vibratory environment, which is a major advantage.

The invention claimed is:

1. A vibrating gyroscope (1), comprising:
   a base (2),
   a resonator (3), comprising a body of cylindrical form terminating in a face (5) at one end, said resonator being mechanically linked to said base,
   the face (5) comprising a plurality of through holes (13) arranged on the circumference of said face (5),
   a plurality of piezoelectric elements (10), arranged in contact with the face (5) of the resonator (3),
   modules (18) for the control and processing of vibration of the resonator, arranged, at least in part, in the base (2), and
   a plurality of electrical connections (15) passing through the body of the resonator (3) via at least one sub-assembly of said through holes (13), and electrically connecting said modules (18) and the plurality of piezoelectric elements (10) for controlling and measuring the vibration of the resonator (3).

2. The gyroscope (1) as claimed in claim 1, in which:
   the holes (13) are arranged substantially uniformly on the circumference of the face (5), and
   the piezoelectric elements (10) are arranged between said holes (13).

3. The gyroscope (1) as claimed in claim 1, comprising an interconnection circuit (20) connecting the plurality of electrical connections (15), and being connected to the piezoelectric elements (10).

4. The gyroscope (1) as claimed in claim 1, comprising a linking foot (21) between the resonator (3) and the base (2), said foot (21) being arranged at the level of the extension of a central hole (13) of the face (5) of the resonator.

5. The gyroscope (1) as claimed in claim 4, in which the control and processing modules (18) of the base (2) and the piezoelectric elements (10) are connected by at least one electric connection passing through the linking foot (21).

6. The gyroscope (1) as claimed in claim 1, in which:
part of the piezoelectric elements (10) is capable of detecting vibrations of the resonator, and
the other part of the piezoelectric elements (10) is capable of exciting the resonator in vibration.

7. The gyroscope (1) as claimed in claim 1, in which each piezoelectric element (10) at the same time comprises a sub-element (23) capable of detecting vibrations of the resonator and a sub-element (24) capable of exciting the resonator in vibration.

8. The gyroscope as claimed in claim 7, in which the resonator is capable of vibrating as per
a first vibration mode comprising antinodes distributed over two axes,
a second vibration mode comprising antinodes distributed over two other axes,
the face of the resonator on each axis of the first and of the second vibration mode comprising two piezoelectric elements (10), each piezoelectric element (10) at the same time comprising at least one piezoelectric sub-element (23) capable of exciting the resonator in vibration and at least one piezoelectric sub-element (24) capable of detecting vibrations of the resonator.

9. A production process of a vibrating gyroscope (1), comprising steps of:
providing a base (2),
forming a resonator (3), comprising a body of cylindrical form terminating in a face (5) at one end,
the face (5) comprising a plurality, of through holes (13) arranged on he circumference of said face (5),
disposing a plurality of piezoelectric elements (10) in contact with the face (5) of the resonator (3),
mechanically assembling the resonator (3) on the base (2),
placing vibration control and processing modules (18) in the base (2), and
electrically connecting said modules (18) and the plurality of piezoelectric elements (10) via a plurality of electrical connections (15) passing through the body of the resonator (3) via at least one sub-assembly of said through holes (13), for controlling and measuring vibration of the resonator (3).

\* \* \* \* \*

UNITED STATES PATENT AND TRADEMARK OFFICE
CERTIFICATE OF CORRECTION

Page 1 of 1

PATENT NO. : 8,910,520 B2
APPLICATION NO. : 13/996428
DATED : December 16, 2014
INVENTOR(S) : Alain Jeanroy It is certified that error appears in the above-identified patent and that said Letters Patent is hereby corrected as shown below:

In the Claims,

Column 10, Claim 9, line 10, please delete "plurality," and insert --plurality--.

Column 10, Claim 9, line 11, please delete "he" and insert --the--.

Signed and Sealed this
Twenty-eighth Day of July, 2015

Michelle K. Lee
*Director of the United States Patent and Trademark Office*